United States Patent

Bastelberger et al.

[11] Patent Number: 5,708,093
[45] Date of Patent: Jan. 13, 1998

[54] CORE/SHELL COPOLYMER DISPERSION WHOSE SHELL COMPRISES HYDROLYZABLE ORGANOSILICON COMONOMERS

[75] Inventors: Thomas Bastelberger; Hermann Lutz, both of Emmerting; Peter Heiling, Burghausen, all of Germany

[73] Assignee: Wacker-Chemie GmbH, Munich, Germany

[21] Appl. No.: 505,354

[22] PCT Filed: Mar. 3, 1994

[86] PCT No.: PCT/EP94/00624
§ 371 Date: Oct. 2, 1995
§ 102(e) Date: Oct. 2, 1995

[87] PCT Pub. No.: WO94/20556
PCT Pub. Date: Sep. 15, 1994

[30] Foreign Application Priority Data

Mar. 4, 1993 [DE] Germany .................. 43 06 861.6

[51] Int. Cl.$^6$ ............................................ C08F 291/00
[52] U.S. Cl. ............................. 525/288; 525/902; 523/201
[58] Field of Search ........................... 523/201; 525/288, 525/902

[56] References Cited

U.S. PATENT DOCUMENTS

| | | |
|---|---|---|
| 3,814,716 | 6/1974 | Kowalski et al. . |
| 4,886,852 | 12/1989 | Numa ............................ 524/458 |
| 5,120,889 | 6/1992 | Yamamoto et al. ............ 524/260 |
| 5,461,125 | 10/1995 | Lu et al. ........................ 525/293 |

FOREIGN PATENT DOCUMENTS

| | | |
|---|---|---|
| 29590/89 | 8/1989 | Australia . |
| 0035332 | 9/1981 | European Pat. Off. . |
| 0327376 | 8/1989 | European Pat. Off. . |
| 0444827 | 9/1991 | European Pat. Off. . |
| 2148457 | 4/1973 | Germany . |
| 2148458 | 4/1973 | Germany . |
| 3834638 | 4/1989 | Germany . |
| 3803450 | 8/1989 | Germany . |
| 1407827 | 9/1975 | United Kingdom . |

OTHER PUBLICATIONS

"Vinyl and Diene Monomers, Part 1", E.C. Leonard Ed., Wily–Interscience, New York (1970) p. 149ff.

*Primary Examiner*—Ralph H. Dean
*Attorney, Agent, or Firm*—Burgess,Ryan & Wayne

[57] ABSTRACT

The invention relates to core/shell copolymer dispersions whose shell comprises hydrolyzable organosilicon comonomers, the shell consisting of a copolymer comprising, a) from 70 to 95% by weight of acrylic and/or methacrylic $C_1$ to $C_{10}$ alkyl esters of which from 20 to 80% by weight, based on the overall weight of a), have a water-solubility of not more than 2 g/l and from 80 to 20% by weight, based on the overall weight of a), have a water-solubility of at least 10 g/l, b) from 5 to 25% by weight of one or more ethylenically unsaturated, functional and water-soluble monomers including a proportion of from 25 to 100% by weight, based on the overall weight of b), of unsaturated carboxylic acids, and c) from 0.01 to 10% by weight of one or more olefinically unsaturated, hydrolyzable silicon compounds of the general formula $R^1-Si(OR^2)_3$, and whose core, making up a proportion of from 75 to 98% by weight of the overall weight of the core/shell copolymer, consists of a polymer comprising d) one or more comonomers from the group consisting of vinyl esters, acrylic and/or methacrylic esters, vinyl chloride, vinylaromatic compounds and ethylene.

10 Claims, No Drawings

CORE/SHELL COPOLYMER DISPERSION WHOSE SHELL COMPRISES HYDROLYZABLE ORGANOSILICON COMONOMERS

BACKGROUND OF THE INVENTION

1) Field of the Invention

The invention relates to core/shell copolymer dispersions whose shell comprises hydrolyzable organosilicon comonomers, to processes for their preparation, and to their use as binders for paints, plasters and tile adhesives having good water resistance.

2) Background Art

In order to improve wet adhesion in their application as coating compositions, comonomers comprising silanol groups are incorporated by copolymerization into the copolymers of polymer dispersions. In accordance with the prevailing teaching, binders of high quality in terms of their water resistance are obtained by polymerizing a hydrolyzable organosilicon compound together with the major proportion of the monomers employed. The prior art describes a range of methods for achieving this.

U.S. Pat. No. 3,814,716 describes polymer dispersions based on vinyl acetate, acrylic ester, maleic and/or fumaric ester with 0.5–5% of a copolymerizable silane. The silane is dissolved in the entirety of the monomers employed, and the monomers—including the silane—are divided into an initial charge and a portion which is metered in slowly in the course of polymerization.

DE-C-21 48 457 (GB-A-1 407 827) discloses the use of dispersions containing silanol groups as binders of architectural coating compositions. Polymers of vinyl esters, acrylic esters or butadiene/styrene copolymers are used, into which silanol groups are incorporated by copolymerization, and which exhibit outstanding adhesion to mineral substrates. The preparation of such silanol group-containing vinyl ester polymers is the subject of DE-C-21 48 458 (GB-A-1 407 827), where it is taught to prepare the polymers by the emulsion polymerization method with the organosilicon monomers being metered in in the course of polymerization, since otherwise, if the silane is included in the initial charge, the dispersion would contain coagulates and lose its adhesion properties.

DE-A-38 03 450 (AU-A 89/29590) relates to low-emission polymer dispersions based on ethylenically unsaturated comonomers and from 0.05 to 2% by weight of ethylenically unsaturated, hydrolyzable organosilicon compounds. They are prepared by the emulsion polymerization method, with the addition of the silicon monomer being a matter of open choice—it can take place together with the comonomer phase or separately, during the entire duration of polymerization or with the first half and/or the second half of the comonomer phase.

DE-A-38 34 638 (U.S. Pat. No. 4,886,852) describes a highly complex multistage process for the preparation of an aqueous dispersion. In a first stage, a nonaqueous dispersion is prepared comprising 1 to 90% by weight of a vinyl monomer which contains alkoxysilane groups, 1 to 25% by weight of an α,β-ethylenically unsaturated carboxylic acid, and 9 to 98% by weight of a further unsaturated monomer which can be polymerized by a free-radical mechanism. In a second stage, at least one further free-radically polymerizable monomer, in an organic solvent in which the polymer particles formed are insoluble, is reacted in the presence of the dispersion stabilizing resin prepared in stage 1 to give a likewise nonaqueous dispersion. In a third stage, the neutralized nonaqueous dispersion is converted by addition of water into an aqueous dispersion. The dispersions prepared in accordance with this teaching are suitable, on the basis of their good water resistance, as coating compositions.

EP-A-35 332 describes the use of unsaturated organosilicon compounds for the preparation of dispersions which are suitable as binders in dispersion tile adhesives. In addition to the organosilicon compound, the copolymers also contain aromatic vinyl monomers and (meth) acrylate monomers. They are prepared by including a portion of the monomer phase with acrylic acid in the initial charge, and metering in the remaining portion with the entirety of organosilicon monomer.

EP-A-327 376 relates to a process for the preparation of silyl-containing copolymers of vinyl esters, if desired in a mixture with further comonomers, such as acrylic esters, ethylene or vinyl chloride, which have a low content of silane monomer and exhibit good binder properties. In the process, a portion of the silane is included in the initial charge together with a portion of the other monomers, and the remaining portion of the silane and of the monomers is metered in. The uniform distribution of the silane units in the polymer chain is regarded as being particularly advantageous.

EP-A-444 827 discloses a process for the emulsion polymerization of core/shell copolymers which comprise a core of vinyl ester/olefin/acrylate/vinylsilane copolymer and a vinyl ester/olefin shell. The initial charge in a polymerization comprises a portion of a mixture of vinyl ester, acrylate and silane; ethylene is injected, and the remaining portion of the comonomer mixture is metered in. Following the end of the metering of silane-containing monomer, a second, silane-free vinyl ester metering is commenced. This process brings about the formation of a silane-containing hydrophobic core, which has particular strength because of crosslinking via the silane groups, and the formation of a silane-free shell.

SUMMARY OF THE INVENTION

The object of the present invention was therefore to provide copolymer dispersions in which organosilicon comonomers are incorporated so favorably into the copolymer that, even with small proportions of organosilicon monomer, copolymer dispersions are obtained which have high-quality binder properties, such as water resistance, plaster hardness or abrasion resistance.

This object has been achieved by a procedure in which the unsaturated organosilicon component, together with a small quantity of predominantly hydrophilic monomer, is reacted to give a water-swellable to alkali-soluble protective colloid which subsequently, in the course of the polymerization of the major proportion of the hydrophobic monomer in the absence of further unsaturated organosilicon compounds, covers the resulting hydrophobic core as a shell layer. In this procedure, the organosilicon compounds are incorporated into the copolymer so favorably that it is possible, using unusually low quantities of organosilicon compound, to obtain high-quality binder properties.

The invention provides core/shell copolymer dispersions having solids contents of from 45 to 65% whose shell comprises hydrolyzable organosilicon comonomers, the proportion of the shell in the core-shell copolymer being from 2 to 25% by weight and the shell consisting of a copolymer comprising a) from 70 to 95% by weight, based on the overall weight of the shell, of acrylic and/or methacrylic $C_1$ to $C_{10}$ alkyl esters of which from 20 to 80% by weight, based on the overall weight of a), have a water-solubility of not more than 2 g/l and from 80 to 20% by weight, based on the overall weight of a), have a water-solubility of at least 10 g/l, b) from 5 to 25% by weight, based on the overall weight of the shell, of one or more ethylenically unsaturated, functional and water-soluble monomers including a proportion of from 25 to 100% by weight, based on the overall weight of b), of unsaturated carboxylic acids, and c) from 0.01 to 10% by weight, based on the overall weight of the shell, of one or more olefinically unsaturated, hydrolyzable silicon compounds of the general formula $R^1$—$Si(OR^2)_3$, in which $R^1$ is an organic radical which is olefinically unsaturated in the ω-position, and $R^2$, which is identical or different at each occurrence, is a primary and/or secondary alkyl or acyl radical which is optionally substituted with alkoxy groups, and whose core, making up a proportion of from 75 to 98% by weight of the overall weight of the core/shell copolymer, consists of a polymer comprising d) one or more comonomers from the group consisting of vinyl esters, acrylic and/or methacrylic esters, vinyl chloride, aromatic vinyl compounds and ethylene.

DESCRIPTION OF THE PREFERRED EMBODIMENT

Suitable constituents of the mixture a) are the esters of acrylic and/or methacrylic acid with straight-chain or branched aliphatic $C_1$ to $C_{10}$ alcohols, in combination if desired with the corresponding diesters of fumaric of maleic acid. A table relating to the water-solubility of these esters can be found in "Vinyl and Diene Monomers, Part 1", E. C. Leonard Ed., Wiley-Interscience, New York (1970) p. 149 ff.

Examples of suitable esters of acrylic, methacrylic, fumaric of maleic acid having a water-solubility of not more than 2 g/l are butyl acrylate, ethylhexyl acrylate, ethyl methacrylate, butyl methacrylate, dibutyl maleate or fumarate and diethylhexyl maleate or fumarate. It is preferred to use butyl acrylate and/or ethylhexyl acrylate.

Examples of suitable esters having a water-solubility of more than 10 g/l are methyl acrylate, methyl methacrylate and ethyl acrylate. Particular preference is given to ethyl acrylate and/or methyl methacrylate.

Suitable constituents of the mixture b) are acrylic, methacrylic, itaconic, fumaric and/or maleic acid and the corresponding alkali metal salts and ammonium salts; the mono- and, if appropriate, diamides thereof, which may be substituted on the nitrogen by one or two methylol groups; the monoesters of the above-mentioned dicarboxylic acids with $C_1$ to $C_3$ alcohols; vinyl sulfonates, esters and/or amides of unsaturated carboxylic acids which are substituted with sulfonate groups, styrenes which are substituted with sulfonate groups; N-vinylpyrrolidone, N-vinylformamide, and the hydroxyl-substituted esters of unsaturated carboxylic acids.

Preferred water-soluble monomers b) are acrylic acid, methacrylic acid and the alkali metal salts and ammonium salts thereof, acrylamide, methacrylamide, N-methylolacrylamide or -methacrylamide, vinyl sulfonate, hydroxyethyl acrylate, and esters and/or amides of acrylic or methacrylic acid which are substituted with sulfonate groups, an example being sulfopropyl methacrylate. Particular preference is given to acrylic acid, methacrylic acid, acrylamide and methacrylamide.

Suitable olefinically unsaturated, hydrolyzable silicon compounds c) are γ-acryloyl- or γ-methacryloyl-oxypropyltri(alkoxy) silanes and vinyltrialkyoxysilanes, examples of the alkoxy groups which can be employed being methoxy, ethoxy, methoxyethylene, ethoxyethylene, methoxypropylene glycol ether.and ethoxypropylene glycol ether radicals. Another possibility for use is tris-acetoxyvinylsilane. Particular preference is given to vinyltriethoxysilane, γ-methacryloyloxypropyltriethoxysilane and trisacetoxyvinylsilane.

Examples of suitable free-radical polymerizable, unsaturated monomers d) are the branched or unbranched alkyl esters whose acid component consists of from 2 to 12 carbon atoms. Examples of component d) are vinyl acetate, vinyl propionate, vinyl pivalate, vinyl 2-ethyl-hexanoate, VeoVa® 9 and VeoVa® 10 (vinyl esters of α-branched carboxylic acids having 9 to 10 carbon atoms). Other suitable monomers d) are the monoolefinically unsaturated mono- or dicarboxylic esters whose acid component consists of 3 to 5 carbon atoms and whose alcohol component consists of 1 to 8 carbon atoms, examples being acrylic and/or methacrylic esters of methanol, ethanol, butanol and/or 2-ethylhexanol, such as methyl methacrylate, butyl acrylate and/or 2-ethylhexyl acrylate.

The above-described monomers from the class of the unsaturated vinyl esters and of the monoolefinically unsaturated mono- or dicarboxylic esters may if desired be employed in combination with vinyl chloride and/or ethylene.

Other suitable monomers d) are aromatic vinyl compounds, preferably styrene in combination with monomers from the group of the monoolefinically unsaturated mono- or dicarboxylic esters. In small quantities it is also possible to employ polyethylenically unsaturated monomers such as allyl methacrylate, divinyl adipate, butanediol diacrylate and triallyl cyanurate, in quantities of from 0 to 2% by weight, preferably from 0.05 to 0.5% by weight, based in each case on the overall weight of the monomers d).

The monomers d) employed are preferably vinyl acetate, VeoVa® 9, VeoVa® 10 trademarks of the Shell Oil Company for vinyl esters of a synthetic saturated monocarboxylic acid mixture of highly branched $C_9$ and $C_{10}$ isomers, methyl methacrylate, butyl acrylate, 2-ethylhexyl acrylate, vinyl chloride, ethylene and/or styrene.

The core/shell copolymer preferably comprises: from 5 to 15% by weight of a shell copolymer comprising a) from 80 to 95% by weight, based on the overall weight of the shell, of comonomer a), of which from 40 to 60% by weight comprises butyl acrylate and/or ethylhexyl acrylate and from 60 to 40% by weight, based in each case on the overall weight of the comonomers a), comprises ethyl acrylate, methyl acrylate and/or methyl methacrylate, b) from 5 to 15% by weight, based on the overall weight of the shell, of acrylic acid and/or methacrylic acid, together if desired with acrylamide and/or methacrylamide, c) from 0.5 to 10% by weight, based on the overall weight of the shell, of vinyltriethoxysilane, γ-methacryloyloxypropyltriethoxysilane and/or tris-acetoxyvinylsilane, and from 75 to 95% by weight of a core copolymer based on vinyl chloride-ethylene, vinyl chloride-ethylene-vinyl acetate, vinyl chloride-ethylene-VeoVa9 and/or VeoVa10, vinyl acetate-ethylene, vinyl acetate-VeoVa9 and/or VeoVa10, methyl methacrylate-butyl acrylate, methyl methacrylate-2-ethylhexyl acrylate, methyl methacrylate-butyl acrylate-VeoVa9 and/or VeoVa10, styrene-butyl acrylate, styrene-butyl acrylate-VeoVa9 and/or VeoVa10, styrene-2-ethylhexyl acrylate-VeoVa9 and/or VeoVa10 or styrene-2-ethylhexyl acrylate copolymers.

Particularly preferred core copolymers are vinyl chloride copolymers with an ethylene content of from 5 to by weight which may if desired also contain from 1 to by weight of vinyl acetate, VeoVa9 and/or VeoVa10; vinyl acetate copolymers containing from 5 to 25% by weight of ethylene and/or from 1 to 40% by weight of VeoVa9 and/or VeoCa10, methyl methacrylate copolymers containing from 30 to 60% by weight of butyl acrylate or 2-ethylhexyl acrylate, which may if desired also contain from 1 to 20% by weight of VeoVa9 and/or VeoVa10; and styrene copolymers containing from 30 to 60% by weight of butyl acrylate or 2-ethylhexyl acrylate, which may if desired also contain from 1 to 20% by weight of VeoVa9 and/or VeoVa10.

The invention additionally provides a process for the preparation of copolymer dispersions comprising hydrolyzable organosilicon comonomers and having solids contents of from 45 to 65% by free-radical emulsion polymerization of from 2 to 25% by weight, based on the overall weight of the comonomers a), b), c) and d), of a comonomer mixture comprising a) from 70 to 95% by weight, based on the overall weight of comonomers a), b) and c), of acrylic and/or methacrylic $C_1$ to $C_{10}$ alkyl esters of which from 20 to 80% by weight, based in each case on the comonomers a), have a water-solubility of at least 10 g/l, with b) from 5 to 25% by weight, based on the overall weight of comonomers a), b) and c) of one or more ethylenically unsaturated, functional and water-soluble monomers including a proportion of from 25 to 100% by weight, based on the comonomers b), of unsaturated carboxylic acids, and c) from 0.01 to 10% by weight, based on the overall weight of comonomers a), b) and c), of one or more olefinically unsaturated, hydrolyzable silicon compounds of the general formula $R^1$—$Si(OR^2)_3$ in which $R^1$ is an organic radical which is olefinically unsaturated in the ω-position, and $R^2$, which is identical or different at each occurrence, is a primary and/or secondary alkyl or acyl radical which is optionally substituted with alkoxy groups, in which the constituents mentioned under a), b) and c), together with water and emulsifier, are initially charged to a reactor at a pH of from 2 to 5, polymerization is begun at a temperature of from 40 to 90° C. by adding an initiator, and, at a degree of conversion of at least 150% of the monomers mentioned under a), b) and c), the metered addition is begun of from 75 to 98% by weight, based on the overall weight of the comonomers a), b), c) and d), of one or more further olefinically unsaturated monomers d) from the group consisting of vinyl esters, acrylic and/or methacrylic esters, vinyl chloride, aromatic vinyl compounds and ethylene, and further emulsifier and/or initiator.

The process can be carried out such that the polymerization of the monomers mentioned under d) together with the required emulsifier and/or initiator is either carried out directly following the preparation of the alkali-soluble protective colloid of the first stage, i.e. directly after the end of the metered addition of the comonomer mixture comprising a), b) and c), or is carried out subsequently in a separate stage.

Suitable emulsifiers are nonionic and/or anionic surfactants such as, for example:

1) Alkyl sulfates, especially those having a chain length of from 8 to 18 carbon atoms, alkyl and alkylaryl ether sulfates having 8 to 18 carbon atoms in the hydrophobic radical and 1 to 50 ethylene oxide units.

2) Sulfonates, especially alkylsulfonates having 8 to 18 carbon atoms, alkylarylsulfonates having 8 to 18 carbon atoms, esters and half-esters of sulfosuccinic acid with monohydric alcohols or alkylphenols having 4 to 15 carbon atoms in the alkyl radical; if desired, these alcohols or alkylphenols may also be ethoxylated with from 1 to 40 ethylene oxide units.

3) Partial esters of phosphoric acid, and the alkali metal salts and ammonium salts thereof, especially alkyl and alkylaryl phosphates having 8 to 20 carbon atoms in the organic radical, alkyl ether and alkylaryl ether phosphates having 8 to 20 carbon atoms in the alkyl or alkylaryl radical and 1 to 50 EO units.

4) Alkyl polyglycol ethers, preferably with 8 to 40 EO units and alkyl radicals of 8 to 20 carbon atoms.

5) Alkylaryl polyglycol ethers, preferably with 8 to 40 EO units and 8 to 20 carbon atoms in the alkyl and aryl radicals.

6) Ethylene oxide-propylene oxide (EO-PO) block copolymers, preferably with 8 to 40 EO and PO units.

Preferred anionic emulsifiers in the polymerization of the mixture comprising a), b) and c) are the representatives of groups 1 and 2 having less than 10 ethylene oxide units; emulsifiers which are free of ethylene oxide groups are particularly preferred. For the addition of the monomers d), preferred emulsifiers are the ethoxylated representatives of groups 1 to 5. Particular preference is given to the ethoxylated representatives of group 1.

The polymerization is initiated by the methods which are usually employed. Inorganic or organic peroxidic compounds which are at least partially water-soluble, preferably completely water-soluble, such as peroxo compounds, hydroperoxides and per esters, and water-soluble azo compounds, are particularly suitable. Among those which may be mentioned are alkali metal or ammonium peroxo (di)sulfates or -phosphates, hydrogen peroxide, tert-butyl hydroperoxide, azobiscyanovaleric acid and tert-butyl permaleate. The abovementioned peroxides may also, if desired, be combined in the known manner with reducing agents. Examples of suitable reducing agents are alkali metal formaldehyde sulfoxylates (BRÜOGGOLIT®, RONGALIT®), alkali metal sulfites and bi-sulfites, alkali metal thiosulfates and ascorbic acid. In a known manner, in many cases the use of small quantities of heavy metal salts then becomes appropriate, examples being iron(II) salts. Thermal polymerization using alkali metal or ammonium peroxo(di)sulfates is particularly preferred. Preference is given to the use of a quantity of initiator of from 0.01 to 1.0% by weight, based on the overall weight of the comonomers.

It is possible to employ further conventional auxiliaries, such as buffer substances, regulators or inhibitors which prevent premature polymerization.

In the text below, a particularly preferred embodiment of the process is described in more detail:

The monomers mentioned under b) are introduced as initial charge together with deionized water, from 0.5 to 10 parts, preferably from 1 to 5 parts, by weight of a preferably anionic emulsifier or emulsifier mixture, and, if desired, further conventional additives such as buffers, regulators and inhibitors, and a pH of from 2 to 5, preferably from 2.5 to 4, is established by adding preferably volatile acids or bases such as, for example, formic acid or ammonia. Following addition of the monomers mentioned under a) and c) and the establishment of the polymerization temperature of from 40° to 90° C., preferably from 60° to 80° C., the polymerization is begun by adding an initiator.

As soon as the monomers mentioned under a) to c) have reacted to the extent of from 40 to 99%, preferably from 50 to 95%, the metered addition of the monomers mentioned under d), of the remaining amount of emulsifier and the remaining amount of water in the form of a preemulsion is commenced; if desired, ethylene is injected. In the case where ethylene is copolymerized, the ethylene pressure is preferably maintained at a constant level during the polymerization of from 40 to 80 bar, preferably from 50 to 70 bar, and is allowed to drop toward the end of polymerization by shutting off the supply of ethylene.

After the end of the addition of the constituents d), the supply of initiator is maintained until the monomers employed, except for any ethylene used, have reacted to the extent of more than 98%, preferably more than 99%. The pH of the dispersion is then adjusted to values between 6 and 10, preferably between 7 and 9, any overpressure still present is released, and the dispersion is degassed by applying a vacuum, stripped if desired in a manner known per se and then cooled.

In particular, in the case of the copolymerization of ethylene into the core polymer, from 1 to 10% by weight of the monomers d) are initially introduced together with the monomers a), b) and c) as a swelling agent which cannot, or not to any great extent, be copolymerized with the comonomers a), b) and c). For this purpose, the comonomers d) employed can only be those which under the conditions of the polymerization of the shell polymer do not, or not to any great extent, undergo copolymerization with the monomers a), b) or c). Such monomers are vinyl acetate and vinyl esters of carboxylic acids having 5 to 10 carbon atoms, such as vinyl pivalate, vinyl ethylhexanoate, VeoVa® 9, VeoVa® 10.

The dispersions according to the invention are suitable for the production of polymer-bound plasters having good water resistance, complete heat insulation systems, and interior and exterior paints having good abrasion resistance. In addition, the dispersions are particularly suitable for the production of water-resistant dispersion tile adhesives.

The examples which follow serve to illustrate the invention in more detail.

A) Preparation of the Starting Dispersions

EXAMPLE 1

4120 ml of deionized water, 260 g of a 15% strength by weight aqueous sodium alkylbenzenesulfonate solution, 130 g of a 30% strength by weight aqueous acrylamide solution and 81 g of methacrylic acid were placed in a stirrer autoclave with a capacity of about 16 l. The pH was adjusted to 3.5 with dilute NH$_3$. The autoclave was then evacuated, flushed with nitrogen and evacuated again, and a mixture of 400 g of butyl acrylate, 400 g of methyl methacrylate, 340 g of VeoVa® 10 and 23 g of methacryloyloxypropyltrimethoxysilane (Silan GF 31, Wacker-Chemie GmbH) was introduced under suction. This mixture was stabilized against premature polymerization by the addition of 170 mg of benzoquinone. After heating to 70° C., 100 ml of 20% strength by weight aqueous ammonium persulfate solution were added over the course of 3 minutes. 20 minutes later, the initial monomer charge had reacted to the extent of 55%. At this point in time, 65 bar of ethylene were injected. At the same time, the metered addition of 20% strength by weight aqueous ammonium persulfate solution was begun at a rate of 60 ml/h, as was that of a preemulsion comprising 2780 g of water, 960 g of a 35% strength by weight aqueous solution of a nonylphenol polyethylene oxide sulfate containing about 25 mol of ethylene oxide per mole of emulsifier, and 6540 g of vinyl chloride. During this period, the pH was maintained at between 5 and 6 by adding NH$_3$ and the ethylene pressure was maintained at 65 bar.

After the end of the metered addition of pre-emulsion, the metering of ethylene and initiator was stopped and the contents of the reactor were maintained at 70° C. for one hour. After adjustment of the pH to 8.5 by addition of ammonia, ethylene was blown off and the dispersion was stirred in a vacuum for one hour.

Analysis revealed an ethylene content of about 15%, a solids content of 47.9% and a viscosity (Brookfield viscometer, 20° C., 20 rpm) of 700 mPa.s. The product showed a minimum film-forming temperature of 25° C.

EXAMPLE 2

In the formulation of Example 1, 53.5 g of methacryloyloxypropyltrimethoxysilane were employed in the preparation of the first stage. A dispersion having a solids content of 51.1% and a viscosity of 100 mPa.s was obtained. The dispersion showed a minimum film-forming temperature of 25° C.

EXAMPLE 3

In the formulation of Example 1, in the preparation of the first stage the methacryloyloxypropyltrimethoxysilane was replaced by 77 g of vinyltriethoxysilane (Silan GF 56, Wacker Chemie GmbH). A 49.8% strength dispersion was obtained which had a viscosity of 140 mPa.s. The minimum film-forming temperature was 31° C.

EXAMPLE 4

66 g of butyl acrylate, 66 g of methyl methacrylate, 55 g of VeoVa®10, 6.3 g of methacryloyloxypropyltrimethoxysilane, 21.9 g of a 30% strength by weight acrylamide solution, 13.2 g of methacrylic acid and 43.7 g of a 15% strength by weight solution of an alkylsulfonate in 520 ml of water were initially charged to a 2.4 l laboratory autoclave; ethylene was not injected. The reaction was initiated by addition of ammonium persulfate at 71° C. At a solids content of 17%, an emulsion of 537 g of methyl methacrylate, 537 g of butyl acrylate, 159 g of a 35% strength by weight solution of a sulfated nonylphenol ethoxylate containing about 25 EO units in 458 g of water was added. A dispersion was obtained with a solids content of 52.8% and a viscosity of 2000 mPa.s; the minimum film-forming temperature was 12° C.

EXAMPLE 5

The formulation of Example 4 was altered in the following respects:

In the monomer feed, a mixture of 524 g of styrene and 524 g of butyl acrylate was used instead of methyl methacrylate/butyl acrylate. A 51.8% strength dispersion was obtained which had a viscosity of 6500 mPa.s; the minimum film-forming temperature was 13° C.

EXAMPLE 6

The formulation of Example 1 was altered in the following respects:

In the initial monomer charge, 15 g of methacryloyloxypropyltrimethoxysilane were employed. In the monomer feed, an additional 340 g of VeoVa®10 were used, and the quantity of water was increased correspondingly. A 52.3% strength dispersion was obtained which had a viscosity of 3180 mPa.s; the minimum film-forming temperature was 24° C.

EXAMPLE 7

The formulation of Example 4 was altered in the following respects:

In the monomer feed, a mixture of 322 g of VeoVa®9 and 749 g of vinyl acetate was used instead of methyl methacrylate/butyl acrylate. A 52.3% strength dispersion was obtained which had a viscosity of 490 mPa.s; the minimum film-forming temperature was 25° C.

COMPARISON EXAMPLE 1

The formulation of Example 1 was altered in that, during the preparation, no methacryloxypropyltrimethoxysilane was employed in the initial monomer charge. A dispersion was obtained which had a solids content of 52% at a viscosity of 2500 mPa.s; the minimum film-forming temperature was 19° C.

COMPARISON EXAMPLE 2

The formulation of Example 1 was altered in that, in the initial monomer charge, only butyl acrylate was used instead of the mixture of methyl methacrylate and buryl acrylate. The batch coagulated at the blowing-off stage.

COMPARISON EXAMPLE 3

The formulation of Example 4 was altered in that, in the course of preparation, no methacryloyloxypropyltrimethoxysilane was used in the initial monomer charge. A dispersion was obtained which had a solids content of 52.7% at a viscosity of 7050 mPa.s. The minimum film-forming temperature was 13° C.

COMPARISON EXAMPLE 4

The formulation of Example 5 was altered in that no methacryloyloxypropyltrimethoxysilane was used in the initial monomer charge. A dispersion was obtained which had a solids content of 52% and a viscosity of 11,800 mPa.s. The minimum film-forming temperature was 14° C.

COMPARISON EXAMPLE 5

The formulation of Example 7 was altered in that no methacryloyloxylpropyltrimethoxysilane was used in the initial monomer charge. A dispersion was obtained which had a solids content of 52.2% and a viscosity of 1325 mPa.s. The minimum film-forming temperature was 26° C.

COMPARISON EXAMPLE 6

The formulation of Example 1 was altered in that no methacryloyloxypropyltrimethoxysilane was used in the initial monomer charge; 77 g of vinyltriethoxysilane were used in the feed. A dispersion was obtained which had a solids content of 49.3% and a viscosity of 1360 mPa.s.

B) Applications-Related Testing

The dispersions from the examples or comparison examples were tested in a formulation for tile adhesives and in a formulation for plasters.

Test formulation for dispersion tile adhesives:

| parts | substance |
|---|---|
| 0.20 | water |
| 0.10 | preservative (Parmetol DF 12) |
| 0.15 | dispersant (Styrodex PK 90) |
| 0.20 | thickener (Tylose MHP 30000yp) |
| 0.25 | thickener (Rohagit SD 15) |
| 0.05 | dispersion auxiliary (AMP 90) |
| 0.15 | ammonia |
| 0.15 | defoamer (Agitan 281) |
| 51.80 | $CaCO_3$ filler (Durcal 40) |
| 8.50 | $CaCO_3$ filler (Durcal 10) |
| 37.75 | dispersion (solids content 50% by weight) |

The adhesives of the above formulation were adjusted using plasticizer (1:1 mixture of Dowanol DPnB and Dowanol PnB) to a minimum film-forming temperature of 0° C.

The adhesives of the above formulation were used to stick ceramic tiles onto concrete, and the tensile adhesion strength of the bonded tiles after different storage cycles was tested in accordance with DIN 18156. The test results are compiled in Table 1:

TABLE 1

| | Tensile adhesive strength [N/mm$^2$] | |
|---|---|---|
| Sample | 28 days normal climatic conditions | 28 days normal climatic conditions/21 days storage in water |
| Example 1 | 1.40 | 0.71 |
| Example 2 | 1.57 | 0.74 |
| Example 3 | 1.74 | 0.67 |
| Example 4 | 1.21 | 0.32 |
| Example 5 | 1.29 | 0.45 |
| Example 6 | 1.84 | 0.59 |
| Example 7 | 1.72 | 0.38 |
| Comp. Ex. 1 | 1.35 | 0.14 |
| Comp. Ex. 3 | 1.30 | <0.10 |
| Comp. Ex. 4 | 1.38 | 0.12 |
| Comp. Ex. 5 | 1.79 | <0.10 |
| Comp. Ex. 6 | 1.53 | 0.12 |

Test formulation for plasters:

| parts | substance |
|---|---|
| 2.50 | preservative (Parmetol DF 12) |
| 2.50 | defoamer (Bevaloid 677) |
| 32.0 | cellulose thickener (Walcocel MW 3000 GB 3% strength) |
| 0.10 | wetting agent (Calgon N dry) |
| 30.0 | titanium dioxide (RN 56) |
| 150.0 | mica filler (Plastorit 0.5) |
| 30.0 | dolomite filler (Microdol 820) |
| 150.0 | heavy spar filler (Fleur) |
| 100.0 | ground quartz (W 4) |
| 140.0 | crystalline quartz sand (No. 8a) |
| 50.0 | crystalline quartz sand (No. 4 extra) |
| 150.0 | dispersion (solids content 50% by weight) |

The abovementioned formulations were adjusted to a minimum film-forming temperature of 0° C. with from 3.0 to 6.5 parts of butyl diglycol acetate, and for the preparation of the plasters were made up to 1000 parts with water.

In order to determine the plaster softening, the penetration depth in accordance with Buchholz (DIN 53153) was determined, and the values from 5 measurements were averaged.

The plaster adhesion was determined manually with a spatula, and given a qualitative rating ranging from 1 to 6 with decreasing adhesion. The results are compiled in Table 2.

TABLE 2

| Sample | Plaster softening [mm] | Plaster adhesion rating |
| --- | --- | --- |
| Example 1 | 3.5 | 2.5 |
| Example 2 | 3.0 | 2.5 |
| Example 4 | 4.5 | 2.0 |
| Example 5 | 4.5 | 2.0 |
| Example 7 | 2.5 | 1.0 |
| Comparison Ex. 1 | 4.5 | 3.5 |
| Comparison Ex. 3 | 4.5 | 4.0 |
| Comparison Ex. 4 | 5.5 | 5.0 |
| Comparison Ex. 5 | 4.5 | 3.0 |
| Comparison Ex. 6 | 4.5 | 3.0 |

Testing of water uptake:

The dispersions were drawn onto a polypropylene sheet in a wet film thickness of 500 μm and were dried at room temperature. After detaching the film from the sheet, specimens measuring 5×5 cm were punched out and their dry weight was determined. The specimens were stored in distilled water for 1 and/or 21 days and then gently dried with a paper towel. The uptake of water, based on the initial weight of the specimen, was determined by weighing; the increase in % by weight is listed in Table 3.

TABLE 3

| Sample | Water uptake after 1 day [%] | Water uptake after 21 days [%] |
| --- | --- | --- |
| Example 1 | 12 | 17 |
| Example 2 | 7 | 3 |
| Example 4 | 21 | 16 |
| Example 5 | 19 | 15 |
| Example 7 | 47 | 63 |
| Comparison Ex. 1 | 12 | 82 |
| Comparison Ex. 3 | 42 | 70 |
| Comparison Ex. 4 | 24 | 111 |
| Comparison Ex. 5 | 60 | 112 |
| Comparison Ex. 6 | 19 | 45 |

We claim:

1. A core/shell copolymer dispersion having a solid content of from 45 to 65% whose shell comprises hydrolyzable organosilicon comonomers, the proportion of the shell in the core-shell copolymer being from 2 to 25% by weight and the shell comprised of a copolymer consisting essentially of a) at least 70% by weight, based on the overall weight of the shell, of acrylic and/or methacrylic $C_1$ to $C_{10}$ alkyl esters of which from 20 to 80% by weight, based on the overall weight of a), have a water-solubility of not more than 2 g/l and from 80 to 20% by weight, based on the overall weight of a), have a water-solubility of at least 10 g/l, b) from 5 to 25% by weight, based on the overall weight of the shell, of one or more ethylenically unsaturated, functional and water-soluble monomers and wherein (b) is comprised of by weight, at least 25% and up to and including 100% of unsaturated carboxylic acids, and c) from 0.01 to 10% by weight, based on the overall weight of the shell, of one or more olefinically unsaturated, hydrolyzable silicon compounds of the general formula $R^1$—Si $(OR^2)_3$ in which $R^1$ is an organic radical which is olefinically unsaturated in the ω-position, and $R^2$, which is identical or different at each occurrence, is a primary and/or secondary alkyl or acyl radical which is optionally substituted with alkoxy groups, and whose core, makes up a proportion of from 75 to 98% by weight of the overall weight of the core/shell copolymer, comprised of a polymer consisting essentially of d) one or more comonomers from the group consisting of vinyl esters, acrylic and/or methacrylic esters, vinyl chloride, aromatic vinyl compounds and ethylene.

2. A core/shell copolymer dispersion as claimed in claim 1, wherein the core/shell copolymer comprises from 5 to 15% by weight of a shell copolymer comprising a) at least 80% by weight, based on the overall weight of the shell, of comonomer a), of which from 40 to 60% by weight comprises butyl acrylate and/or ethylhexyl acrylate and from 60 to 40% by weight, based in each case on the overall weight of the comonomers a), comprises ethyl acrylate and/or methyl methylacrylate, b) from 5 to 15% by weight, based on the overall weight of the shell, of acrylic acid and/or methacrylic acid, optionally with acrylamide and/or methacrylamide, c) from 0.5 to 10% by weight, based on the overall weight of the shell, of vinyltriethoxysilane, γ-methacryloyloxypropyltriethoxysilane and/or trisacetoxyvinylsilane.

3. A core/shell copolymer dispersion as claimed in claim 1, wherein the core-shell copolymer comprises from 75 to 95% by weight of a core copolymer based on vinyl chloride-ethylene copolymers, vinyl chloride-ethylene-vinyl acetate copolymers, copolymers of vinyl chloride and ethylene with vinyl esters of α-branched carboxylic acids having 9 and/or 10 carbon atoms, vinyl acetate-ethylene copolymers, copolymers of vinyl acetate with vinyl esters of α-branched carboxylic acids having 9 and/or 10 carbon atoms, methyl methacrylate-butyl-acrylate copolymers, methyl methacrylate-2-ethylhexyl acrylate copolymers, copolymers of methyl methacrylate and butyl acrylate with vinyl esters of α-branched carboxylic acids having 9 and/or 10 carbon atoms, styrene-butyl acrylate copolymers, styrene-2-ethylhexyl acrylate copolymers, copolymers of styrene and butyl acrylate with vinyl esters of a-branched carboxylic acids having 9 and/or 10 carbon atoms, or copolymers of styrene and 2-ethylhexyl acrylate with vinyl esters of α-branched carboxylic acids having 9-and/or 10 carbon atoms.

4. A process for the preparation of core/shell copolymer dispersions as claimed in claim 1 by free-radical emulsion polymerization of from 2 to 25% by weight, based on the overall weight of comonomers a), b)', c) and d), of a comonomer mixture comprising a) at least 70% by weight, based on the overall weight of the comonomers a), b) and c), of acrylic and/or methacrylic $C_1$ to $C_{10}$ alkyl esters of which from 20 to 80% by weight have a water-solubility of not more than 2 g/l and from 80 to 20% by weight, based in each case on the monomers a), have a water-solubility of at least 10 g/l, with b) from 5 to 25% by weight, based on the overall weight of the comonomers a), b) and c), of one or more ethylenically unsaturated, functional and water-soluble monomers and wherein (b) is comprised of by weight, at least 25% and up to 100% of unsaturated carboxylic acids, and c) from 0.01 to 10% by weight, based on the overall weight of the comonomers a), b) and c), of one or more olefinically unsaturated, hydrolyzable silicon compounds of the general formula $R^1$—Si $(OR^2)_3$ in which $R^1$ is an organic radical which is olefinically unsaturated in the ω-position, and $R^2$, which is identical or different at each occurrence, is a primary and/or secondary alkyl or acyl radical which is optionally substituted with alkoxy groups, in which the constituents mentioned under a), b) and c), together with water and emulsifier, are initially charged to a reactor at a pH of from 2 to 5, polymerization is begun at a temperature of from 40° to 90° C. by adding an initiator, and, at a degree of conversion of at least 50% of the monomers mentioned under a), b) and c), the metered addition is begun of from 75 to 98% by weight, based on the overall weight of the comonomers a), b) c) and d), of one or more further olefinically unsaturated monomers d) from the group consisting of vinyl esters, acrylic and/or methacrylic esters, vinyl chloride, aromatic vinyl compounds and ethylene, and further emulsifier and/or initiator.

5. The process as claimed in claim 4, wherein the monomers mentioned under b) are introduced as initial charge together with deionized water, from 0.5 to 10 parts by weight of a preferably anionic emulsifier or emulsifier mixture, and a pH of from 2 to 5, is established, after addition of the monomers mentioned under a) and c) and the establishment of the polymerization temperature of from 40° to 90° C., the polymerization is begun by adding an initiator, and as soon as the monomers mentioned under a) to c) have reacted to the extent of from 40 to 99%, the metered addition of the monomers mentioned under d), of the remaining amount of emulsifier and the remaining amount of water in the form of a preemulsion is commenced, and after the end of the addition of the constituents d), the supply of initiator is maintained until the monomers employed, except for any ethylene used, have reacted to the extent of more than 98%.

6. The process as claimed in claim 4, wherein, in the case of the copolymerization of ethylene into the core polymer, from 1 to 10% by weight of the monomers d) are initially introduced together with the monomers a), b) and c) as a swelling agent, in which context the comonomers d) employed can only be those which lender the conditions of the polymerization of the shell polymer do not, or not to any great extent, undergo copolymerization with the monomers a), b) or c).

7. A polymer-bound plaster containing as a binder the core/shell copolymer dispersion of claim 1.

8. A heat insulating system containing as a binder the core/shell copolymer dispersion of claim 1.

9. An interior and exterior paint containing as a binder the core/shell copolymer dispersion of claim 1.

10. A tile adhesive containing as a binder the core/shell copolymer dispersion of claim 1.

* * * * *